T. E. LIND.
BUMPER FOR MOTOR VEHICLES.
APPLICATION FILED NOV. 30, 1920.
1,383,470.
Patented July 5, 1921.
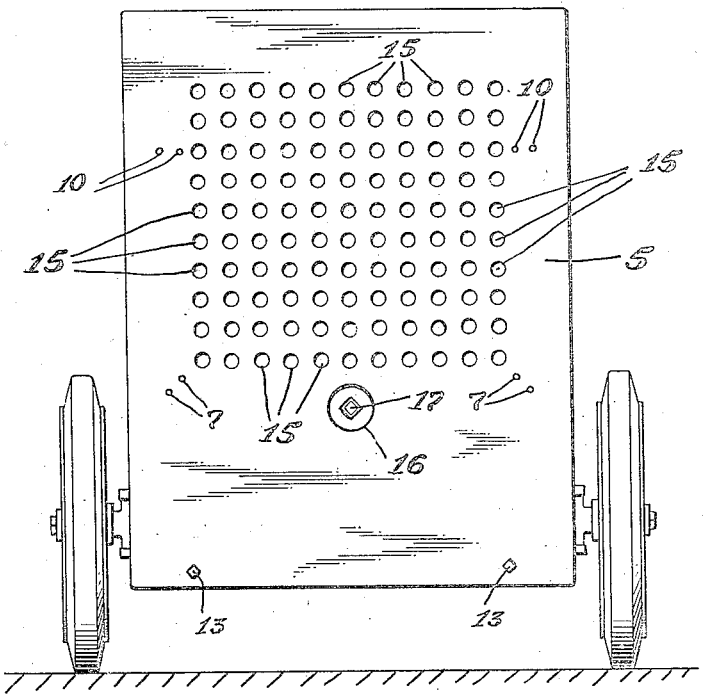
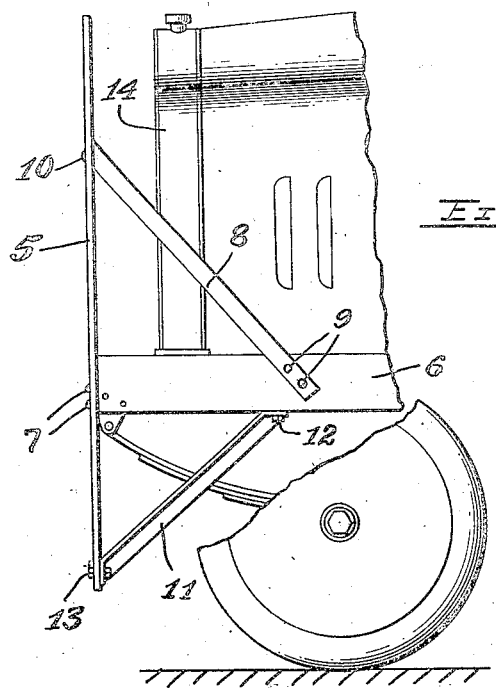
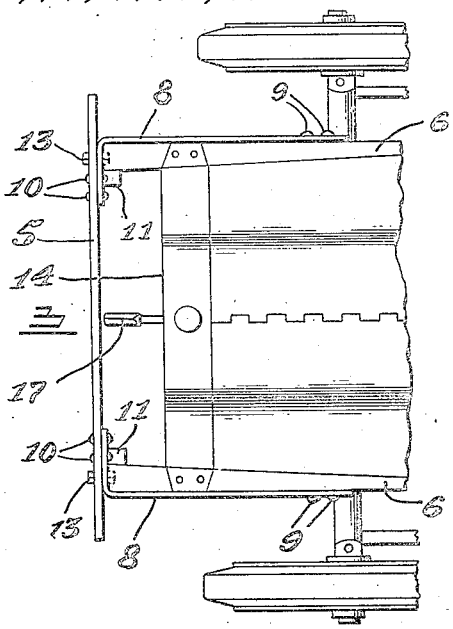
Inventor
Theodore E. Lind.
Attorney
Frank Warren

UNITED STATES PATENT OFFICE.

THEODORE E. LIND, OF SEATTLE, WASHINGTON, ASSIGNOR, BY MESNE ASSIGNMENTS, TO HOOD TRACTOR COMPANY, OF SEATTLE, WASHINGTON.

BUMPER FOR MOTOR-VEHICLES.

1,383,470.     Specification of Letters Patent.     Patented July 5, 1921.

Application filed November 30, 1920. Serial No. 427,270.

*To all whom it may concern:*

Be it known that I, THEODORE E. LIND, a citizen of the United States, residing at Seattle, in the county of King and State of Washington, have invented a certain new and useful Improvement in Bumpers for Motor-Vehicles, of which the following is a specification.

My invention relates to improvements in bumpers for motor vehicles and relates more particularly to the type of vehicles used in handling lumber and the object of my invention is to provide a bumper comprising a plate that is attached to the forward end of the tractor or motor vehicle and is adapted to push loaded cars or wagons of lumber in addition to hauling the same, to thus greatly increase the efficiency of the tractor and expedite the handling of the lumber.

Another object is to provide a bumper having a large bumping surface whereby loads of lumber or other merchandise of varying widths and heights placed upon wheels may be pushed about without injury to the forward end of the tractor or motor vehicle.

A further object is to provide a bumper that embodies strength, durability, simplicity and economy in construction and will be efficient in its operation.

With the above and other objects in view which will appear as the description proceeds, my invention resides in the novel construction, combination, adaptation and arrangement of parts hereinafter described and claimed.

I accomplish these objects by devices illustrated in the accompanying drawings, wherein—

Figure 1 is a view in front elevation of my invention as it appears when secured to the forward end of a tractor;

Fig. 2 is a view in side elevation of the same; and

Fig. 3 is a top plan view of the same.

Referring to the drawings, throughout which like reference numerals indicate like parts, the numeral 5 indicates the bumper plate which is riveted or otherwise fixedly secured to the forward end of the chassis frame 6 of the tractor as by rivets 7.

The numeral 8 indicates the upper side braces which are fixedly secured on their lower ends, as by rivets 9, to the side of the chassis frame 6 and are similarly secured on their upper ends by rivets 10 to the rear face of the plate 5 adjacent the side edges thereof and at a point adjacent the upper end of the said plate 5.

The numeral 11 indicates the lower side braces which have their upper ends fixedly secured by the cap screws 12 to the underside of the chassis frame 6 and are similarly secured on their lower outer ends by the cap screws 13 to the rear face of the plate 5 adjacent the side edges thereof and at a point contiguous to the lower edge of the latter.

The plate 5, as shown in Figs. 2 and 3, is disposed forwardly of and in spaced apart relation with respect to the radiator 14 of the tractor thus permitting free passage of currents of cold air to the radiator for cooling the same. To positively insure the passage of currents of cold air to the radiator 14 I have provided a plurality of holes or openings 15 in the upper half of the plate 5 as shown more clearly in Fig. 1.

To expedite the cranking of the engine of the tractor I have provided a hole or opening 16 disposed substantially on the vertical medial line of the plate 5 through which the crank may be inserted to engage the outer end 17 of the crank shaft of the tractor, in a well known manner.

In order that my bumper plate 5 may be readily adaptable to handle loads of lumber or merchandise of varying widths and heights I have found it advisable in practice to make the bumper plate of a substantially rectangular shape having the lower edge reasonably close to the ground and extending upwardly to a point level or slightly above the level of the radiator 14 thus protecting the same and preventing it from coming in contact with the load of lumber. The width of the plate 5 being sufficient to project beyond the sides of the radiator 14 for a similar purpose.

In practice my bumper plate has demonstrated its efficiency and adaptability in handling and pushing loaded cars or wagons when attached to small tractors of the type used in lumber yards and about lumber mills.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the invention.

What I claim is:

1. In combination with a motor vehicle of a bumper comprising a rectangular plate adapted to be secured to the forward end of the chassis frame of said vehicle in spaced apart relation with respect to the radiator of said vehicle, said plate having a plurality of holes disposed therein, and supports adapted to secure said plate to the forward end of said vehicle.

2. In combination with a motor vehicle, of a bumper comprising a rectangular plate adapted to be secured to the forward end of the chassis frame of said vehicle in spaced apart relation with respect to the radiator of said vehicle, said plate having a plurality of holes disposed therein, upper side supports for said plate having their forward upper ends secured to the rear face of said plate and their lower rear ends secured to said chassis frame, and lower side supports for said plate having their lower ends secured to the rear face of said plate and their upper rear ends secured to said chassis frame.

In witness whereof, I hereunto subscribe my name this 22nd day of November, A. D. 1920.

THEODORE E. LIND.